United States Patent
Kassel et al.

(10) Patent No.: US 11,441,592 B2
(45) Date of Patent: Sep. 13, 2022

(54) ANTI-ROTATION DEVICE FOR FASTENERS

(71) Applicant: United Technologies Corporation, Farmington, CT (US)

(72) Inventors: Kevin Kassel, Meriden, CT (US); Scot A. Webb, Gales Ferry, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 206 days.

(21) Appl. No.: 15/981,590

(22) Filed: May 16, 2018

(65) Prior Publication Data
US 2019/0353197 A1 Nov. 21, 2019

(51) Int. Cl.
F16B 39/10 (2006.01)
F01D 17/10 (2006.01)

(52) U.S. Cl.
CPC .............. F16B 39/10 (2013.01); F01D 17/10 (2013.01); F05D 2220/323 (2013.01); F05D 2260/31 (2013.01)

(58) Field of Classification Search
CPC ...... F16B 39/10; F16D 17/10; F16C 11/0614; B25B 15/008; B25B 23/0078; B25B 23/0085; F01D 17/10
USPC .......... 411/166, 119, 120; 81/13; D8/21, 25, D8/82–84
See application file for complete search history.

(56) References Cited

U.S. PATENT DOCUMENTS

| | | | | |
|---|---|---|---|---|
| 1,140,272 A | | 5/1915 | McClure | |
| 1,319,948 A | * | 10/1919 | Bodine | F16B 39/10 411/120 |
| 3,558,237 A | | 1/1971 | Wall, Jr. | |
| 3,592,421 A | * | 7/1971 | Kopp | B64D 27/26 248/554 |
| 4,243,192 A | * | 1/1981 | Johnson | B64C 3/40 244/131 |
| 4,734,001 A | | 3/1988 | Bennett | |
| 4,889,458 A | * | 12/1989 | Taylor | F16B 21/10 411/383 |
| 4,938,644 A | | 7/1990 | Runels | |
| 4,940,374 A | * | 7/1990 | Gallagher | F01N 13/1805 411/120 |
| 4,943,013 A | * | 7/1990 | Kapala | B64D 27/26 244/54 |
| D386,955 S | * | 12/1997 | Jones | D8/25 |

(Continued)

OTHER PUBLICATIONS

Robelin, Bruno; Extended European Search Report; 19174757.5; dated Oct. 9, 2019; 9 pages.

(Continued)

*Primary Examiner* — Flemming Saether
(74) *Attorney, Agent, or Firm* — Cantor Colburn LLP

(57) ABSTRACT

A locking plate for restricting rotation of a fastener connecting a first component of a gas turbine engine and a second component of a gas turbine engine includes a base having a planar surface receivable in overlapping arrangement with a head of the fastener. A locking portion extends from the base. Engagement between the locking portion and the first component restricts rotation of the locking portion. A key extends from the base and is connectable to the fastener such that the fastener is not rotatable relative to the key when the locking portion has engaged the first component.

9 Claims, 8 Drawing Sheets

(56) References Cited

U.S. PATENT DOCUMENTS

| | | | | |
|---|---|---|---|---|
| 7,603,931 | B1* | 10/2009 | Powell | B25B 15/008 |
| | | | | 81/177.2 |
| 7,708,510 | B2 | 5/2010 | Reimler | |
| 7,866,228 | B2* | 1/2011 | Aronsson | F02C 9/18 |
| | | | | 74/469 |
| 9,714,675 | B2* | 7/2017 | Schepergerdes | F16B 39/12 |
| 9,828,103 | B2* | 11/2017 | Cassagne | B64D 27/26 |
| 2006/0133890 | A1* | 6/2006 | Etoile | F04D 29/563 |
| | | | | 403/122 |
| 2008/0042007 | A1* | 2/2008 | Machado | B64D 27/26 |
| | | | | 244/54 |
| 2009/0116930 | A1 | 5/2009 | Reimler | |
| 2017/0297181 | A1 | 10/2017 | Guyomard | |

OTHER PUBLICATIONS

Communication pursuant to Article 94(3) EPC; International Application No. 19174757.5-1007; International Filing Date: May 15, 2019; dated Feb. 8, 2021; 15 pages.

\* cited by examiner

ANTI-ROTATION DEVICE FOR FASTENERS

BACKGROUND

Embodiments of the present disclosure pertain to the art of fasteners, and more specifically, to a locking apparatus including locking features that prevent a threaded fastener from rotating.

Fasteners, such as threaded bolts or studs, are often used to connect two or more components together. In some applications, it is important to ensure that the threaded fastening element does not rotate once installed relative to the components. Existing anti-rotation devices may be used to prevent unwanted rotation of such fasteners. However, these anti-rotation devices may have shortcomings. For example, depending on the geometry of the components being mated, installation of a anti-rotation device may not be feasible. Accordingly, it is desirable to provide an improved anti-rotation device for a fastener.

BRIEF DESCRIPTION

According to an embodiment, a locking plate for restricting rotation of a fastener connecting a first component of a gas turbine engine and a second component of a gas turbine engine includes a base having a planar surface receivable in overlapping arrangement with a head of the fastener. A locking portion extends from the base. Engagement between the locking portion and the first component restricts rotation of the locking portion. A key extends from the base and is connectable to the fastener such that the fastener is not rotatable relative to the key when the locking portion has engaged the first component.

In addition to one or more of the features described above, or as an alternative, in further embodiments the key is integrally formed with the base.

In addition to one or more of the features described above, or as an alternative, in further embodiments the key is configured to couple to the base.

In addition to one or more of the features described above, or as an alternative, in further embodiments the base further comprises an opening, for receiving the key.

In addition to one or more of the features described above, or as an alternative, in further embodiments the opening is substantially identical in size and shape to the key.

In addition to one or more of the features described above, or as an alternative, in further embodiments the opening is configured to receive the key in a first configuration and a second configuration, wherein in the second configuration, the key is rotated relative to the first configuration.

In addition to one or more of the features described above, or as an alternative, in further embodiments comprising another key extending from the base and connectable to the fastener such that the fastener is not rotatable relative to the another key.

In addition to one or more of the features described above, or as an alternative, in further embodiments the another key is rotated relative to the key about an axis defined by the key and another key.

According to another embodiment, an interface includes a first component including a bracket having a first hole formed therein and a second component including a link coupled to a spherical bearing. The spherical bearing has a second hole formed therein. The second component is positioned adjacent the first component such that the first hole and the second hole are axially aligned. A fastener is positioned within the first hole and the second hole to couple the first component to the second component. A locking plate is receivable in overlapping arrangement with the fastener. The locking plate includes a first portion rotatably coupled to the fastener and a second portion configured to cooperate with the first component to restrict rotation of the locking plate about the longitudinal axis of the fastener.

In addition to one or more of the features described above, or as an alternative, in further embodiments the locking plate includes a base receivable in overlapping arrangement with the fastener, and the first portion of the locking plate includes a key and the second portion of the locking plate includes a locking portion.

In addition to one or more of the features described above, or as an alternative, in further embodiments the key is integrally formed with the base.

In addition to one or more of the features described above, or as an alternative, in further embodiments the key is configured to couple to the base.

In addition to one or more of the features described above, or as an alternative, in further embodiments the fastener further comprises a head having a wrenching feature formed therein, and the key is receivable within the wrenching feature to rotatably couple the locking plate to the fastener.

In addition to one or more of the features described above, or as an alternative, in further embodiments the first component further comprises a surface and at least one bracket feature extending from the surface of the first component.

In addition to one or more of the features described above, or as an alternative, in further embodiments the locking portion cooperates with the at least one bracket feature to restrict rotation of the locking plate about the longitudinal axis of the fastener.

In addition to one or more of the features described above, or as an alternative, in further embodiments comprising a retaining ring positioned to restrict axial movement of the locking plate out of engagement with the fastener.

In addition to one or more of the features described above, or as an alternative, in further embodiments the at least one bracket feature further comprises an inner surface having a groove formed therein, the retaining ring being mounted within the at least one groove.

In addition to one or more of the features described above, or as an alternative, in further embodiments the first component and the second component are part of an actuation system usable in a high pressure compressor of a gas turbine engine.

According to yet another embodiment, a method of restricting rotation of a fastener includes coupling a first component and a second component via a fastener, positioning a locking portion of a locking plate within a clearance defined by one of the first component and the second component to restrict rotation of the locking plate in a first direction, aligning a wrenching feature of the fastener with a key extending from the locking plate, and installing the key within the wrenching feature to rotatably couple the key to the locking plate.

In addition to one or more of the features described above, or as an alternative, in further embodiments comprising installing a retaining ring to restrict axial movement of the locking plate out of engagement with the fastener.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
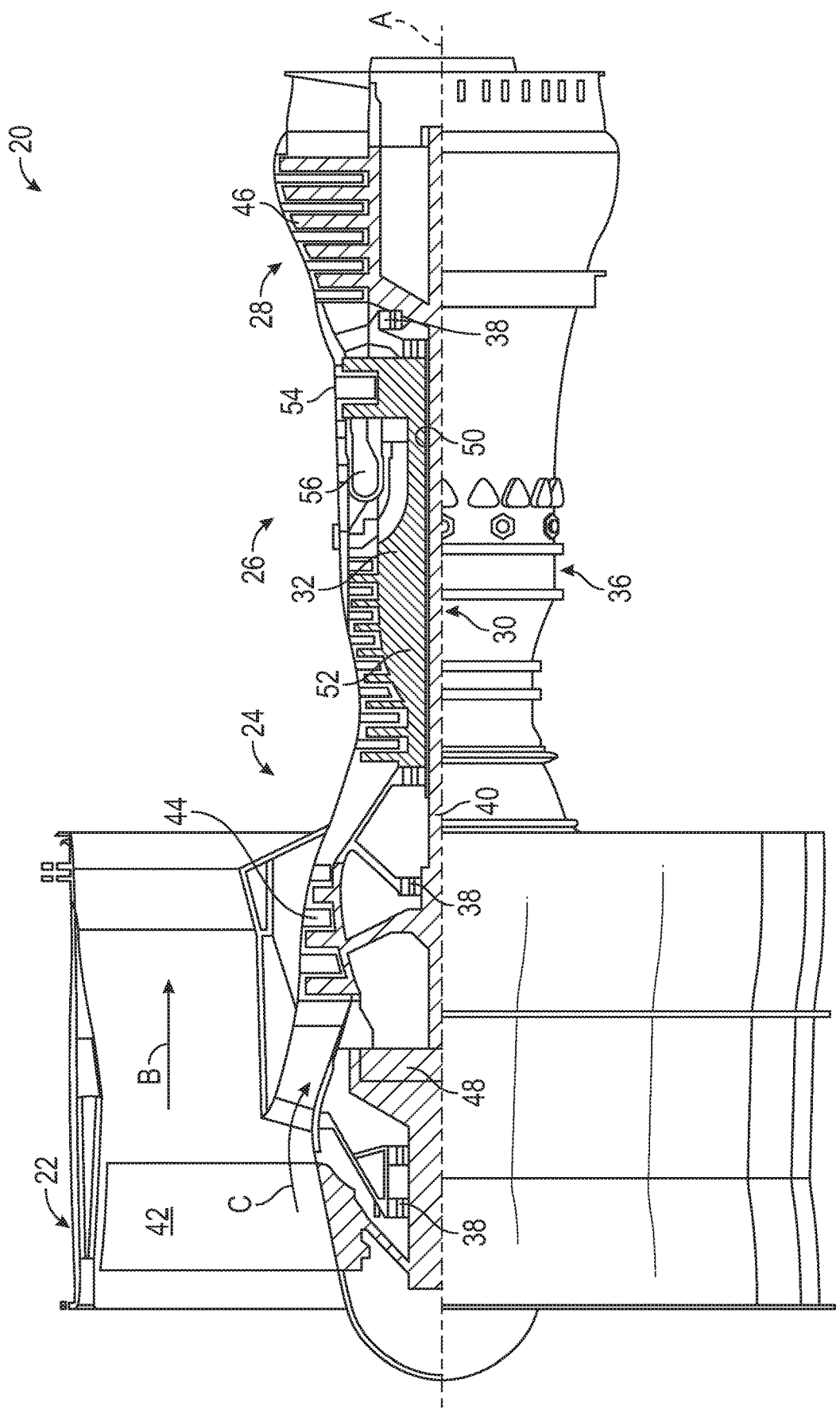
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
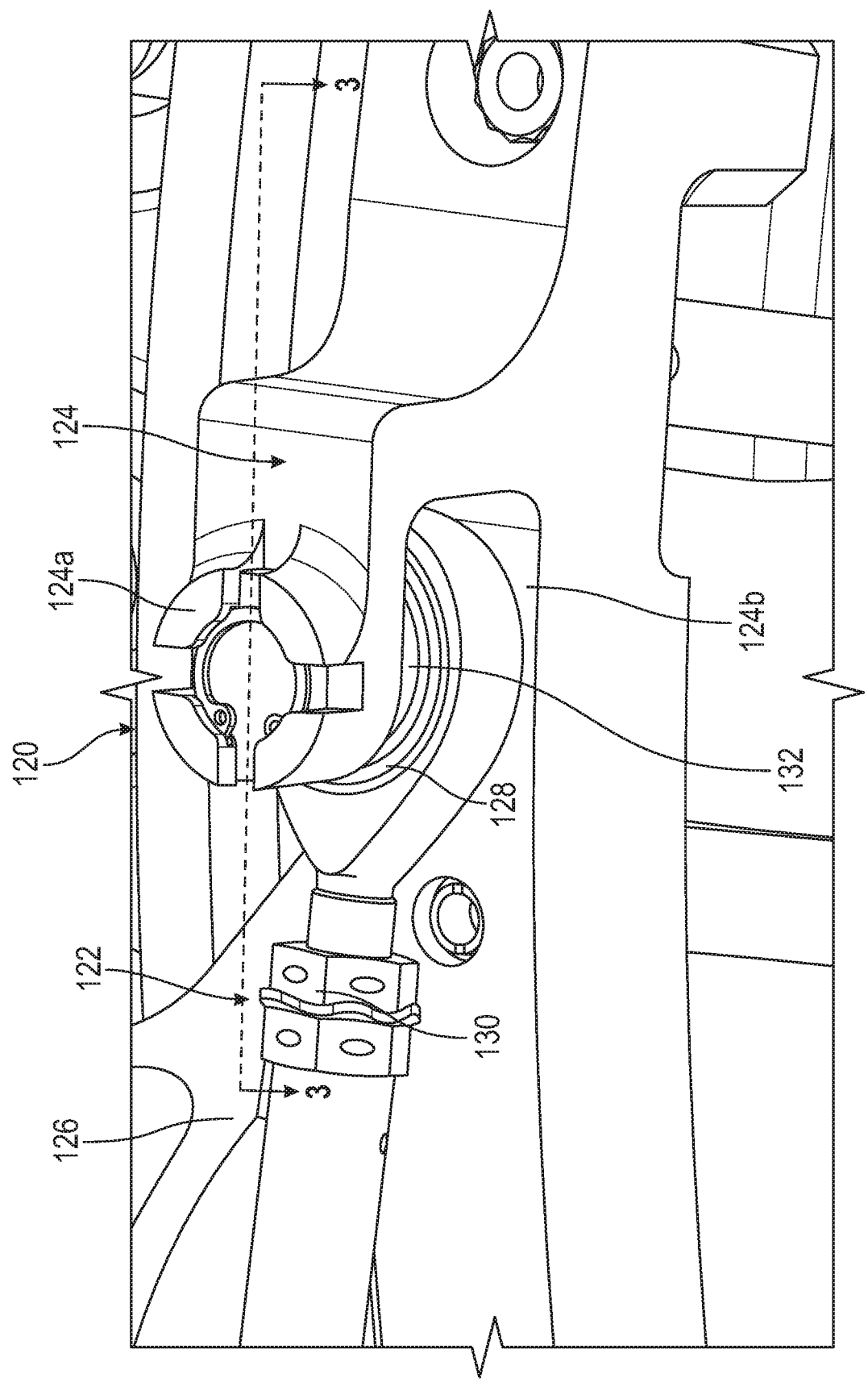
FIG. 2 is perspective view of an interface between a first component and a second component according to an embodiment.
Figure 3:
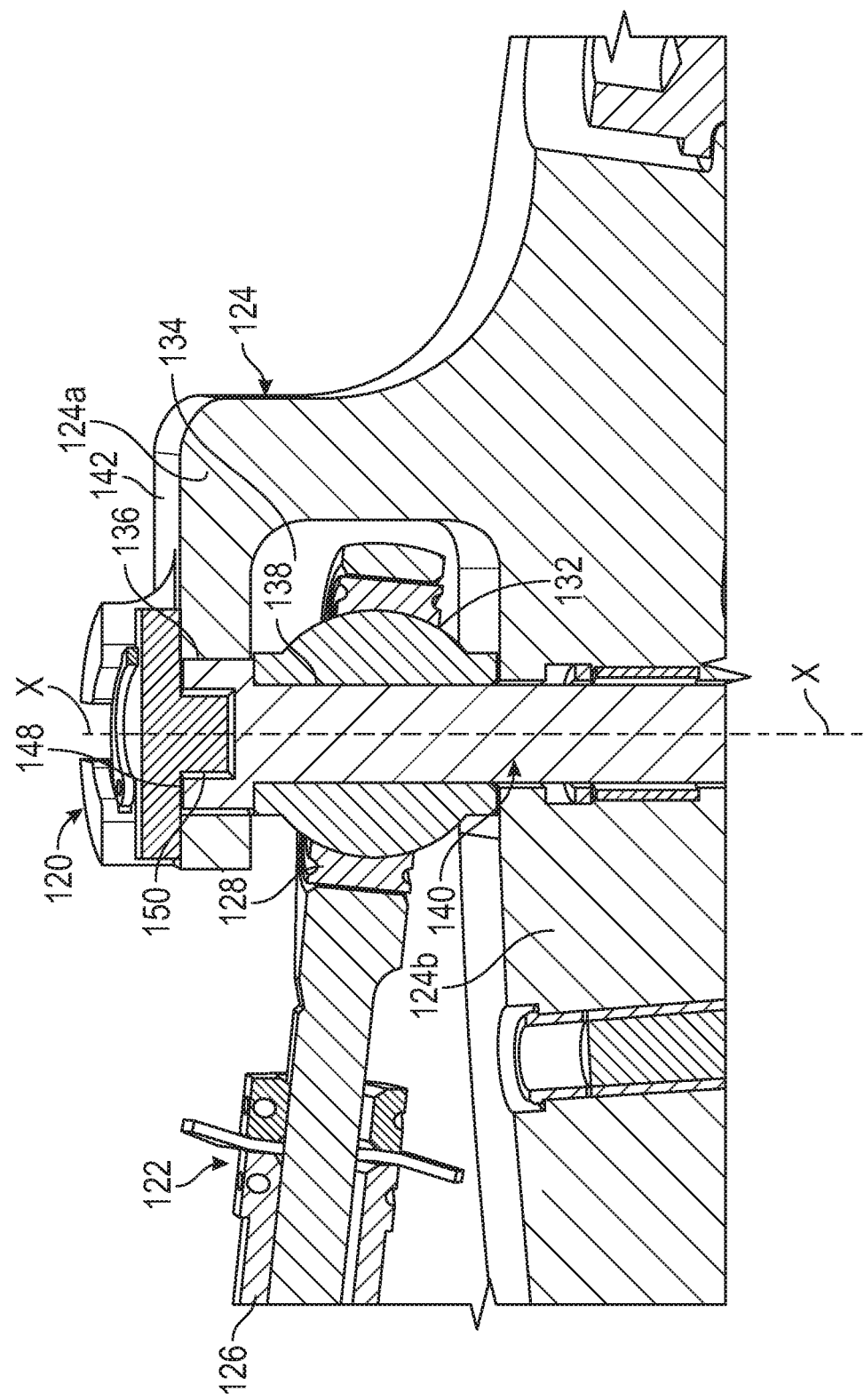
FIG. 3 is a cross-sectional view of the interface of FIG. 2 taken along line A-A according to an embodiment.

With reference now to FIGS. 2 and 3, an example of an interface 120 between a first component 122 and a second component 124 is illustrated. In an embodiment, the first component 122 is a link 126 having an eye 128 arranged at a first end 130 thereof and a spherical bearing 132 is located within the eye 128. The second component 124 is a bracket or housing arranged generally adjacent or in alignment with the eye 128 and/or spherical bearing 132. In the illustrated, non-limiting embodiment, the second component 124 has a first portion 124a and a second portion 124b that define an opening 34 within which the first end 130 and the spherical bearing 132 of the first component 124 are received. A through hole 136 extends through the first portion 124a of the second component 124, the spherical bearing 132, and at least part of the second portion 124b of the second component 124, such that a fastener 140 may be installed therein to couple the spherical bearing 132 and the link 126 to the first and second portions 124a, 124b of the second component 124. Embodiments where the second component 124 includes only a first portion 124a configured to couple to the first component 122 are also within the scope of the disclosure. In the illustrated, non-limiting embodiment, the first and second components 122, 124 are part of an actuation system, such as used in a high pressure compressor of a gas turbine engine, such as shown in FIG. 1 for example; however, it should be understood that any interface 120 between two components is contemplated herein.

Figure 4:
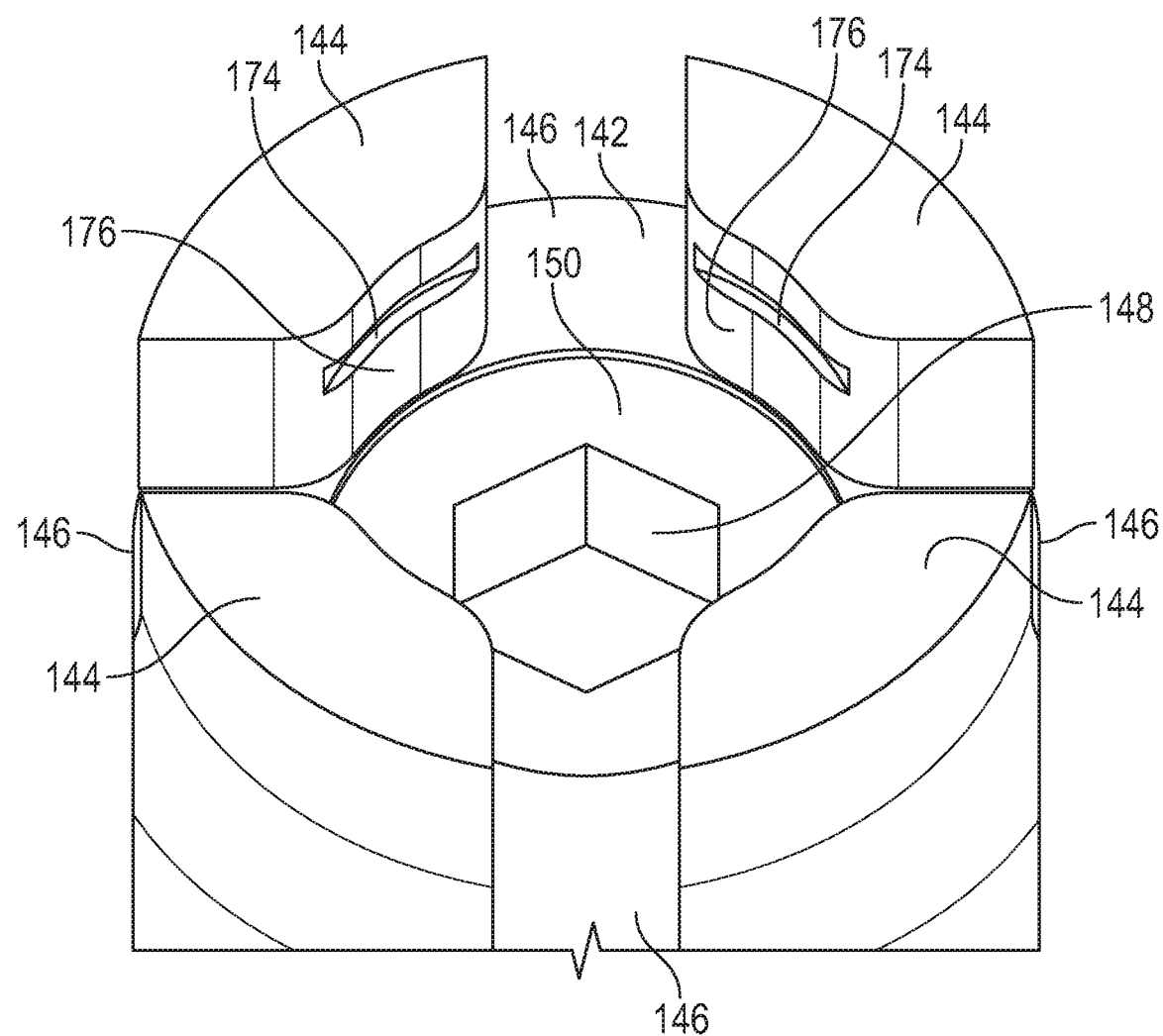
FIG. 4 is a perspective view of at least one bracket feature formed in a surface of the second component according to an embodiment.
Figure 5:
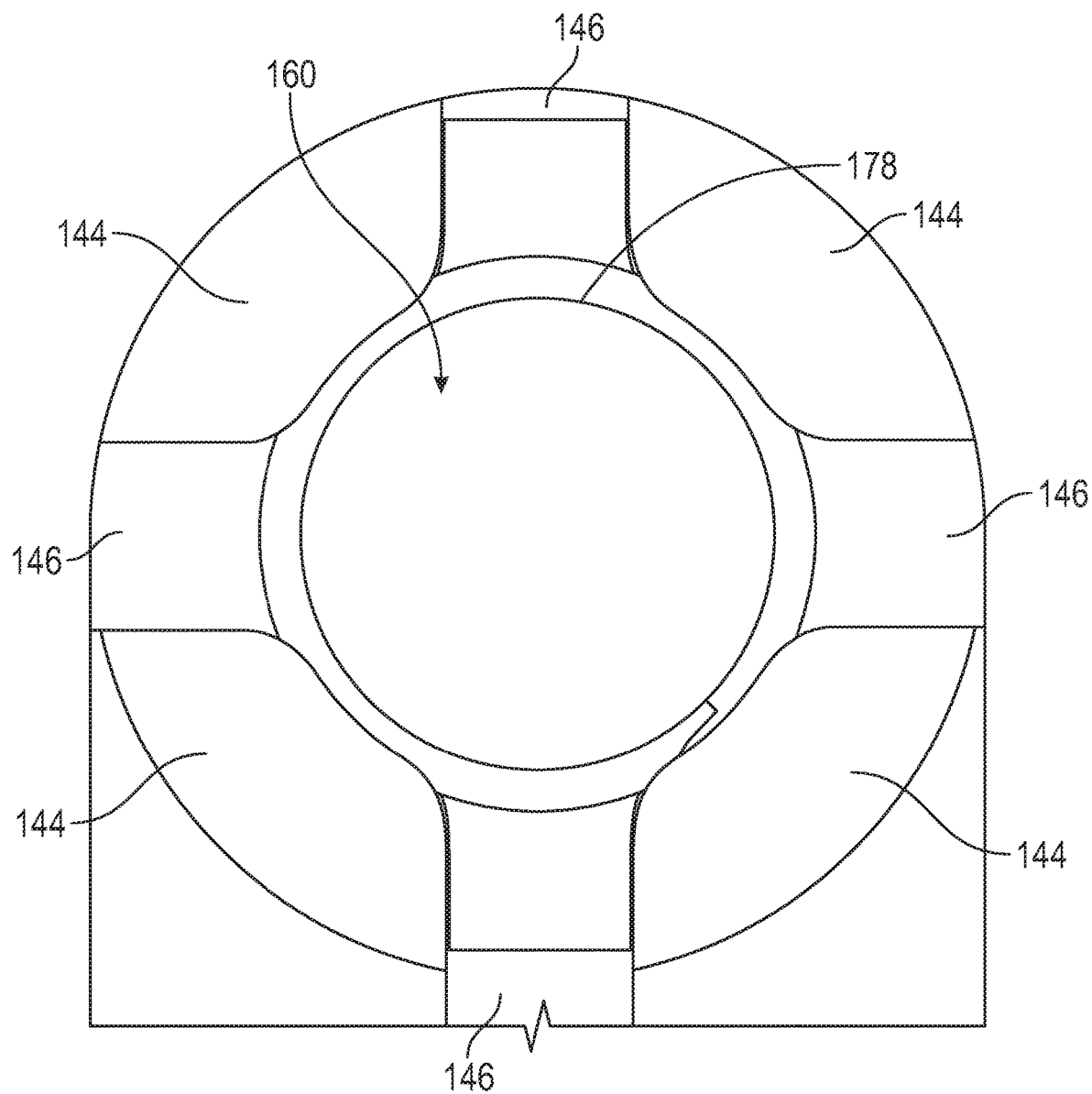
FIG. 5 is a plan view of a locking plate installed relative to the at least one bracket feature formed in a surface of the second component according to an embodiment.
Figure 7:
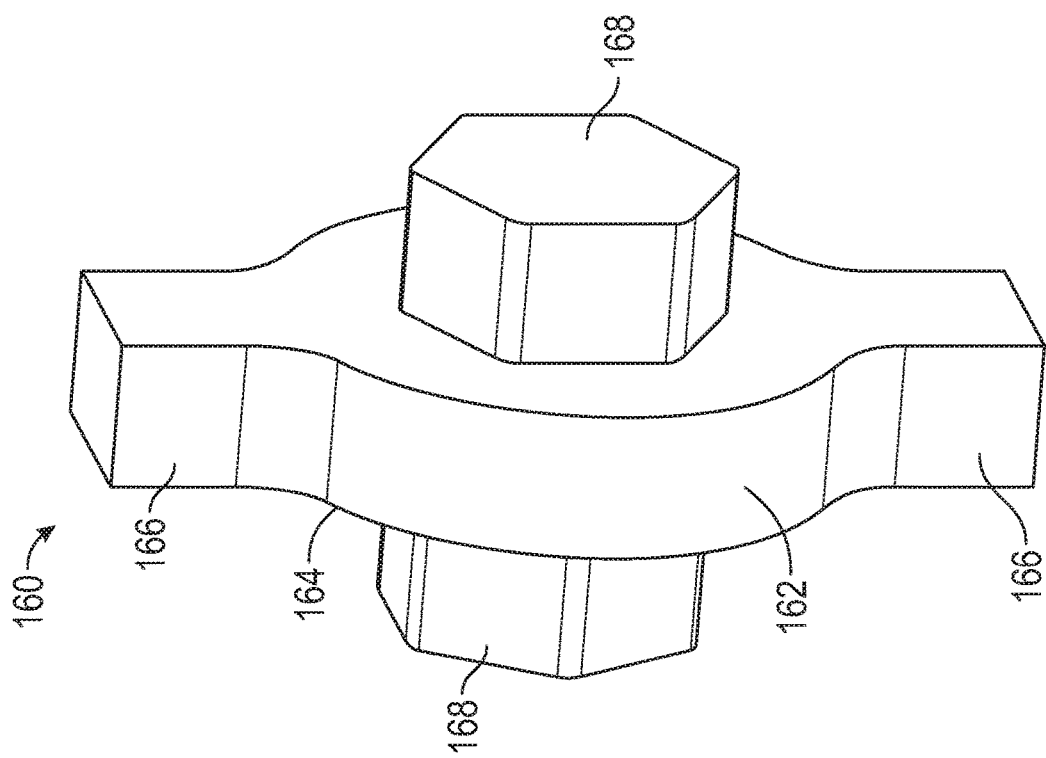
FIG. 7 is a perspective view of another locking plate according to an embodiment.
Figure 6:
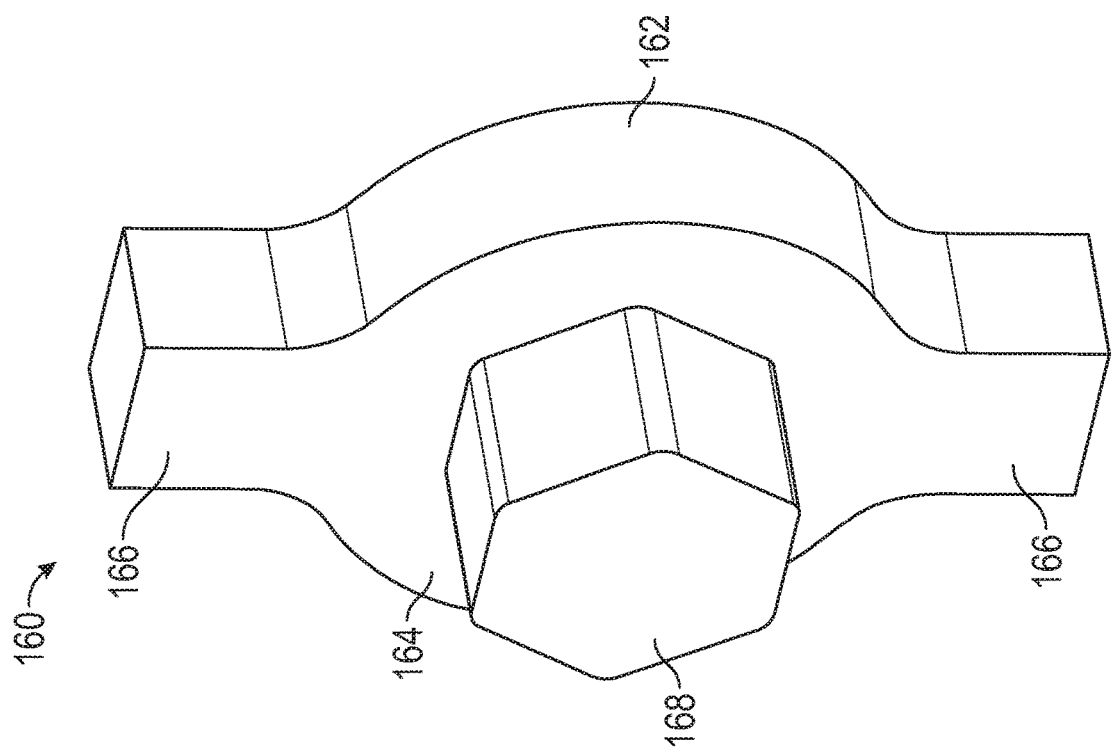
FIG. 6 is a perspective view of a locking plate according to an embodiment.

Protruding from a surface of the second component 124, such as from a surface 142 of the first portion 124a of the second component 124 for example, is at least one bracket feature 144. The at least one bracket feature 144 protrudes generally perpendicular from the surface 142, parallel to the axis X defined by the through hole 136. In the illustrated, non-limiting embodiment, best shown in FIG. 4, the second component 124 includes four bracket features 144 equidistantly spaced about the through hole 136. However, a second component 124 having any number of bracket features 144 is within the scope of the disclosure. In embodiments including a plurality of bracket features 144, the bracket features 144 may be substantially identical, or alternatively, may vary in configuration based on the position of the feature 44 relative to the second component 124. The one or more bracket features 144 are positioned so as not to interfere with the receipt of one or more components, such as the fastener 140, within the through hole 136. In an embodiment, the bracket features 144 define one or more clearances 46 extending radially from an exterior of the fastener 140 to an outer periphery of the surface 142.

As best shown in FIG. 3, a fastener 140, such as a screw or bolt is received within the through hole 136 of the second component 124 and the adjacent and complementary through hole 138 (see FIG. 2) formed in the first component 122. The fastener 140 includes a wrenching feature 148, such as a shaped indentation formed in the head 150 of the fastener 140. The wrenching feature 148 is configured to receive a tool, such as an Allen wrench or screwdriver for example, which is operable to apply a torque to the fastener 140, to further couple the fastener 140 to at least one of the first and second component.

During operation of the system that defines the interface 120 between the first and second component 122, 124, the forces applied thereto may cause the fastener 140 to loosen. With reference now to FIGS. 5-9, a locking plate 160 may be coupled to the fastener 140 to restrict this reverse rotation of the fastener 140 out of engagement with the first and/or second component 122, 124. The locking plate 160 includes a base 162 having a generally planar surface 164 adapted to contact the exposed upper surface of the head 150. The base 162 further includes at least one locking portion 166, which is receivable against a surface 142 of the second component 124, at a position located radially outward from the fastener 140. The locking portion 166 is received within a clearance 146 defined by the at least one bracket feature 144. When the locking portion 166 is arranged within the clearance 146, the engagement between the locking portion 166 and the one or more adjacent bracket features 144 restricts rotation of the locking plate 160 in a direction associated with decoupling the fastener 140 from the first and second components 122, 124.

In some embodiments, the base 162 of the locking plate 160 includes a plurality of locking portions 166, such as two locking portions, as shown in the FIGS. However, a locking plate 160 including any number of locking portions, including a single locking portion 166 or more than two locking portions 166, is contemplated herein. Although the plurality of locking portions 166 are shown as being axially aligned and spaced 180° from one another, embodiments where the plurality of locking portions 166 are arranged at another angle relative to one another are also within the scope of the disclosure. The configuration of the plurality of locking portions 166 may be selected in response to the application in which the locking plate 160 is being used and the configuration of the at least one bracket feature 144.

The locking plate 160 additionally includes a key 168 configured to couple the base 162 of the locking plate 160 to the fastener 140. The key 168 typically has a size and shape corresponding to the wrenching feature 48 formed in the fastener 40, such that the key 168 is receivable within the wrenching feature 148 in a manner similar to a tool. The key 168 is designed such that the key 168 is not able to rotate relative to the fastener 40 once installed within the wrenching feature 48. In an embodiment, best shown in FIG. 6, the key 168 is integrally formed with the base 162. In such embodiments, the key 168 protrudes from a first surface of the base 162, such as surface 164 for example, such that when the locking portion 166 is aligned with a clearance 146, the key 168 is axially aligned with the wrenching feature 148.

In some embodiments, limited rotation of the fastener 140 may be required, prior to installation of the locking plate 160, to position the wrenching feature 148 such that the key 168 is receivable therein when the locking portion 166 is arranged within the clearance 146. To reduce the rotation that may be required, a second key 168 may protrude from a second opposite surface 170 of the base 162. Although the first key 168 and the second key 168 are substantially identical, the second key 168 is rotated at an angle relative to the first key 168 such that a greater number of configurations of the key 168 relative to the base 162 are provided when the locking portion 166 is aligned with a clearance 146.

Figure 8:
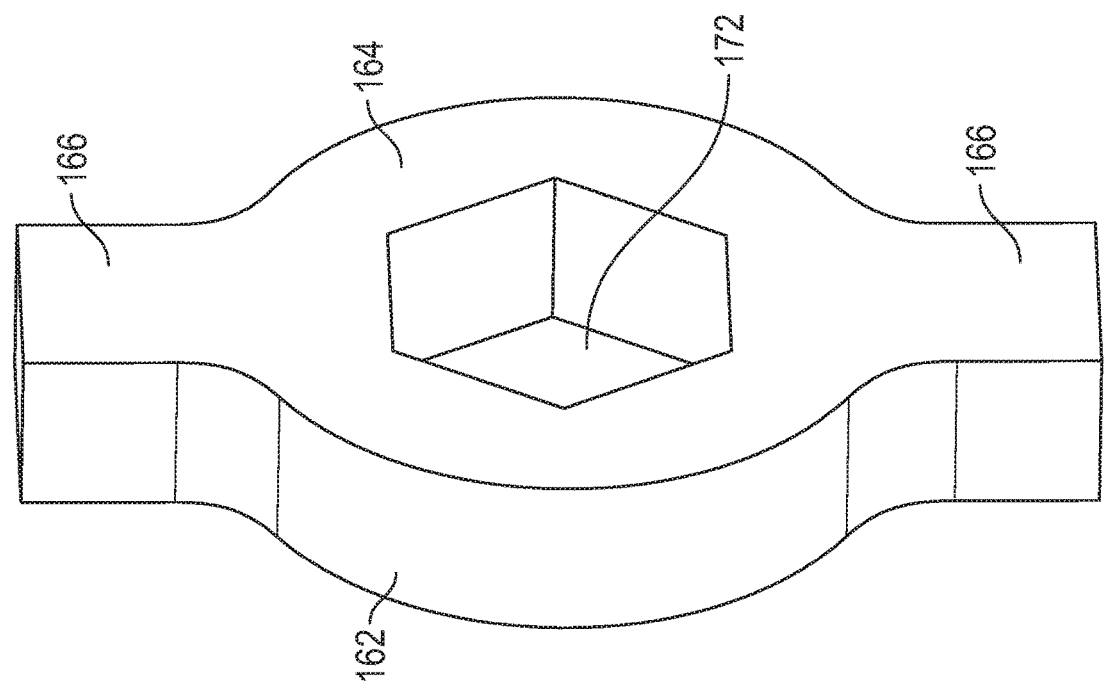
FIG. 8 is a perspective view of a base of a locking plate according to an embodiment.
Figure 8:
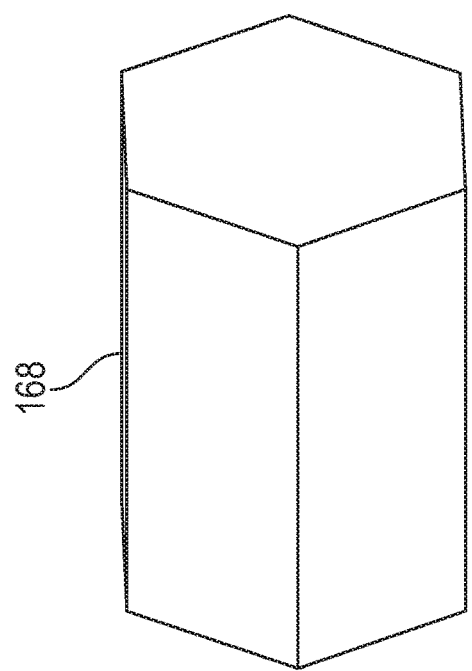
Figure 9:
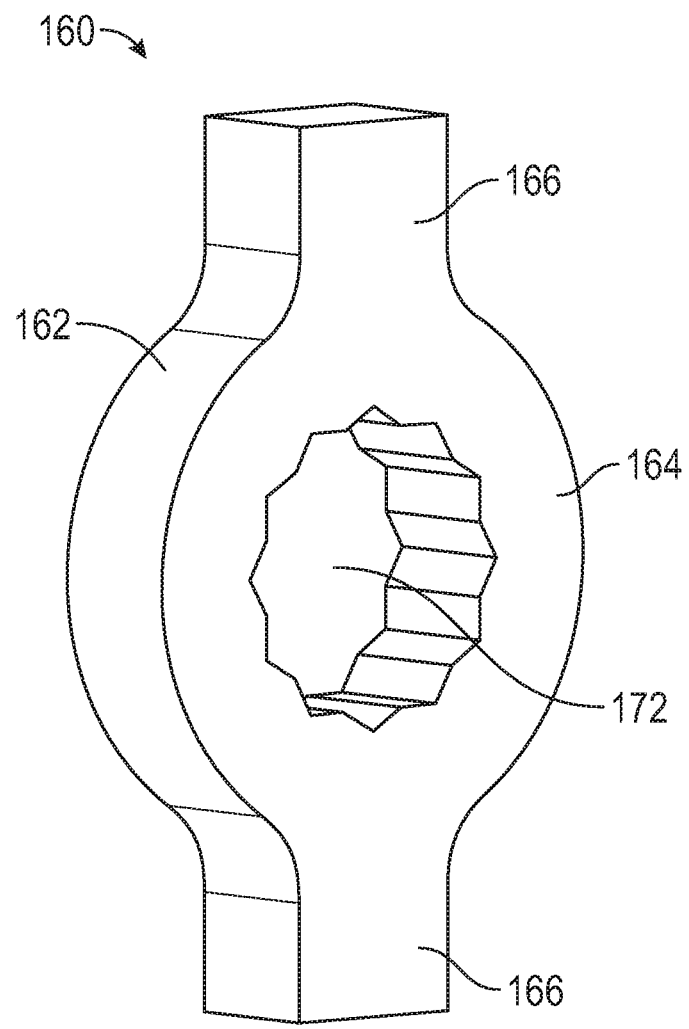
FIG. 9 is a perspective view of another base of a locking plate according to an embodiment.

In another embodiment, best shown in FIGS. 8 and 9, the key 168 and the base 162 are formed as separate components. Accordingly, an opening 172 may be formed in the base 162 of the locking plate 160 for receipt of a key 168 therein. In such embodiments, a first portion of the key 168 is installed within the wrenching feature 148 and a second portion of the key 168 is coupled to the base 162 via the opening 172. In an embodiment, the opening 172 may be substantially identical to the configuration of the key 168, as shown in FIG. 8. However, in another embodiment (FIG. 9), the opening 172 may be configured to receive the key 168 in a variety of configurations where the key is rotated about the longitudinal axis X defined by the fastener 140. In such embodiments, the rotation of the fastener 140 required to align the key 168 arranged within the wrenching feature 148 with the opening 172 of the base 162 when a locking portion 166 of the base 162 is arranged within a clearance 146 defined by the bracket features 144 is reduced.

In an embodiment, one or more components may be used to restrict axial movement of the locking plate 160 away from the fastener 140, i.e. out of engagement with the wrenching feature 148. In the non-limiting embodiment of FIGS. 4 and 5, a groove 174 is formed in an inner surface 176 of the at least one bracket feature 144 and a retaining ring 178, such as a snap ring for example, may be positioned therein. As shown, the groove 144 is vertically positioned such that at least a portion of the key 168 is always arranged within the wrenching feature 148. However, it should be understood that other methods and/or components for restricting movement of the locking plate 160 relative to the fastener 140, such as a set screw for example, are also within the scope of the disclosure.

The interface 120 including the locking plate 160 illustrated and described herein does not rely of the clamping force of the fastener 140 to restrict rotation of the fastener 140 out of engagement with the first and second components 122, 124. Further, although a fastener 140 having a custom wrenching feature 148 may be used, standard fasteners 140 having a wrenching feature 148 formed therein are also suitable.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An interface comprising:
    a first component including a bracket having a first hole formed therein;
    a second component including a link coupled to a spherical bearing, the spherical bearing having a second hole formed therein, the second component being positioned adjacent the first component such that the first hole and the second hole are axially aligned;
    a fastener positioned within the first hole and the second hole to couple the first component to the second component, the fastener including a head having a wrenching feature formed therein; and
    a locking plate receivable in overlapping arrangement with the fastener, the locking plate including a first portion connectable to the fastener and a second portion configured to cooperate with the first component to restrict rotation of the locking plate about the longitudinal axis of the fastener, wherein the first portion of the locking plate includes a key, the key being receivable within the wrenching feature to rotatably couple the locking plate to the fastener.

2. The interface of claim 1, wherein the locking plate includes a base receivable in overlapping arrangement with the fastener, and the first portion of the locking plate includes a key and the second portion of the locking plate includes a locking portion.

3. The interface of claim 2, wherein the key is integrally formed with the base.

4. The interface of claim 2, wherein the key is configured to couple to the base.

5. The interface of claim 2, wherein the first component further comprises:
    a surface; and
    at least one bracket feature extending from the surface of the first component.

6. The interface of claim 5, wherein the locking portion cooperates with the at least one bracket feature to restrict rotation of the locking plate about the longitudinal axis of the fastener.

7. The interface of claim 5, further comprising a retaining ring positioned to restrict axial movement of the locking plate out of engagement with the fastener.

8. The interface of claim 7, wherein the at least one bracket feature further comprises an inner surface having a groove formed therein, the retaining ring being mounted within the at least one groove.

9. The interface of claim 1, wherein the first component and the second component are part of an actuation system usable in a high pressure compressor of a gas turbine engine.

* * * * *